(12) United States Patent
Blaymore (10) Patent No.: US 6,572,189 B1
(45) Date of Patent: Jun. 3, 2003

(54) PIVOTING, SLIDABLE INFANT CAR SEAT

(76) Inventor: Lee M Blaymore, 3550 Woodward St., Oceanside, NY (US) 11572-4531

( * ) Notice: Subject to any disclaimer, the term of this patent is extended or adjusted under 35 U.S.C. 154(b) by 0 days.

(21) Appl. No.: 10/109,904

(22) Filed: Mar. 29, 2002

(51) Int. Cl.[7] .............................................. B60N 2/28
(52) U.S. Cl. ........................... 297/256.12; 297/256.16; 297/256.1
(58) Field of Search ...................... 297/256.12, 256.16, 297/250.1, 14, 256.1

(56) References Cited

U.S. PATENT DOCUMENTS

| | | | |
|---|---|---|---|
| 1,501,005 A | 8/1924 | Larsen | |
| 2,266,200 A | 12/1941 | Hedley | |
| 2,465,026 A | 3/1949 | Martz | |
| 2,587,679 A | 3/1952 | Atkinson | |
| 3,253,856 A | 5/1966 | Ueda | |
| 3,789,444 A | 2/1974 | McCord | |
| 4,740,030 A | * 4/1988 | Nordskog | ................... 297/14 |
| 4,936,629 A | 6/1990 | Young | |
| 5,292,179 A | 3/1994 | Forget | |
| 5,318,339 A | 6/1994 | Cherniak | |
| 5,425,552 A | 6/1995 | Retziaff | |
| 5,482,354 A | 1/1996 | Gryp | |
| 5,651,576 A | 7/1997 | Wallace | |
| 5,890,764 A | 4/1999 | Lee | |
| 6,199,949 B1 | * 3/2001 | DaSilva | ................. 297/256.12 |
| 6,283,545 B1 | * 9/2001 | Ernst | ..................... 297/256.16 |
| 6,431,647 B2 | * 8/2002 | Yamazaki | .............. 297/256.12 |

* cited by examiner

Primary Examiner—Anthony D. Barfield
(74) Attorney, Agent, or Firm—Michael I Kroll (57) ABSTRACT

An infant car seat 16 is mounted on a stationary platform 28 which comprises a lower horizontal plate 42 and a vertical plate 26 extending from one edge thereof. The stationary platform 28 is secured by the seatbelts 68 against the rear seat 14 of the automobile 12 adjacent the door 18. The child seat 16 is pivotably attached to a vertical portion 26 of the stationary platform 28 by means of a hinge assembly 24 that allows the user 20 to stand outside of the vehicle 12 and swing the seat 16 into a position to enable them to place the child 22 directly therein in a face-to-face manner and then swing the seat back into place and lock it into a secure position. The child seat is secured to a seat support mechanism comprising a support bar 44 pivotably connected to a hinge assembly 24 that slides along a track assembly 30 so as to maintain the car seat in a protected area within the vehicle when in the pivoted position.

15 Claims, 13 Drawing Sheets

PIVOTING, SLIDABLE INFANT CAR SEAT

BACKGROUND OF THE INVENTION

1. Field of the Invention

The present invention relates generally to infant car seats, and more specifically, to an infant car seat that provides for the selective linear and rotational movement of the infant seat to allow a user to remove or place a child therein without awkward twisting and turning. The present invention has a stationary platform comprising a lower horizontal plate and a vertical plate extending from one edge thereof. Said stationary platform is secured by the seatbelts against the rear seat of the automobile adjacent the door. The child seat is pivotably attached to a vertical portion of the stationary platform by means of a hinge assembly that allows the user to stand outside of the vehicle and swing the seat into a position to enable them to place the child directly therein in a face-to-face manner and then swing the seat back into place and lock it into a secure position. The child seat is secured to a seat support mechanism comprising a support bar pivotably connected to a hinge assembly that slides along a track assembly so as to maintain the car seat in a protected area within the vehicle when in the pivoted position. It becomes more difficult to place children into car seats as they get older and heavier and the present invention will increase the ease in which the child can be placed therein while relieving the stress on the guardian's back.

2. Description of the Prior Art

There are other rotatable car seat devices designed for automobiles. Typical of these is U.S. Pat. No. 1,501,005 issued to Carl M. Larsen on Jul. 8, 1924.

Another patent was issued to John Hedley on Dec. 16, 1941 as U.S. Pat. No. 2,266,200. Yet another U.S. Pat. No. 2,465,026 was issued to Joseph G. Martz on Mar. 22, 1949 and still yet another was issued to Dale S. Atkinson on Mar. 4, 1952 as U.S. Pat. No. 2,587,679.

Another patent was issued to Yoshihiro Ueda on May 31, 1966 as U.S. Pat. No. 3,253,856. Yet another U.S. Pat. No. 3,789,444 was issued to Byron McCord on Feb. 5, 1974. Another was issued to Quentin Young on Jun. 26, 1990 as U.S. Pat. No. 4,936,629 and still yet another was issued on Mar. 8, 1994 to Dominique A. Forget as U.S. Pat. No. 5,292,179. A patent was issued on Jun. 7, 1994 to Trexie I. Cherniak as U.S. Pat. No. 5,318,339 and on Jun. 20, 1995 U.S. Pat. No. 5,425,522 was issued to Scott Retzlaff.

Another patent was issued to Dennis J. Gryp on Jan. 9, 1996 as U.S. Pat. No. 5,482,354. Yet another U.S. Pat. No. 5,651,576 was issued to Robert James Wallace on Jul. 29, 1997. U.S. Pat. No. 5,890,764 was issued to Chang-Seog Lee on Apr. 6, 1999.

U.S. Pat. No. 1,501,005

Inventor: Carl M. Larsen

Issued: Jul. 8, 1924

A device for the purpose set forth, an angularly disposed base designed to rest on the seat of an automobile, a hook on the outer portion thereof to engage the cushion of the automobile seat, a hollow pedestal arising centrally from the base having inner threads, a cross sectionally U-shaped guide on the outer face of the pedestal, a plate receiver therein and secured to the base, a cushioned seat, a threaded post depending therefrom received in and engaging the threads of the pedestal, and means for locking the post adjusted in the pedestal.

U.S. Pat. No. 2,266,200

Inventor: John Hedley

Issued: Dec. 16, 1941

In combination with a vehicle having a floor and a side wall defining a door opening, a seat adjacent the door opening and normally facing in a direction parallel to the wall defining said opening, supporting means for said seat depending therefrom and resting on the floor, a bar projecting from said seat, said bar having an enlarged head, means defining an arcuate guideway attached to the side wall adjacent the door opening, said guideway being adapted to receive said head for pivotal movement of the latter in a plane parallel to the floor, spring urged locking means operable on said head in the extremes of its movement in said guideway, and vertically projecting means extending adjacent the level of the seat for effecting the release of said locking means.

U.S. Pat. No. 2,465,026

Inventor: Joseph G. Martz

Issued: Mar. 22, 1949

A seat frame for a portable seat, comprising an open frame adapted for supporting the edges of a fabric seat piece, a seat frame supporting arm attached to a front portion of said frame supporting arm attached to a front portion of said frame and extending on an incline downwardly therefrom to a junction with a flat base portion generally parallel to and spaced below said seat frame, and a seat supporting arm extending upwardly and rearwardly from said base portion and attached at its upper rear end to a rear portion of said frame, said base portion being provided at its forward end with a downward and rearwardly extending hook member.

U.S. Pat. No. 2,587,679

Inventor: Dale S. Atkinson

Issued: Mar. 4, 1952

In combination with an automobile having a floor and a side wall defining a door opening and said opening normally closed by a door hinged to said side wall; an adjustable seat for said automobile comprising: transverse guides supported by said floor; a plate member mounted for sliding movement on said guides; a seat section positioned within said automobile and receivable by said plate member for rotation thereon in the sliding movement thereof on said guides; power means for moving said plate member along said guides;, comprising a piston slidably mounted in a cylinder and connected to said plate member.

U.S. Pat. No. 3,253,856

Inventor: Yoshihiro Ueda

Issued: May 31, 1966

Apparatus for use with a seat and a door of a vehicle, said apparatus comprising means rotatably supporting the seat adjacent the door of the vehicle, said means including a hollow rotary shaft secured to said seat and having a lower portion with elongated longitudinal grooves therein, a latch shaft disreplaceably supported in the hollow shaft and including a latch extending through the grooves of the rotary shaft, a clutch member surrounding the hollow shaft and having grooves for engaging the latch, said latch shaft having first and second positions within said hollow shaft, said latch engaging the grooves in the clutch member in one of said positions and being free of said grooves in the other of the positions, said clutch member being coupled to the hollow shaft for common rotation therewith with the latch engaged in the grooves of the clutch member, whereas said clutch member and hollow shaft are disengaged and free of relative rotation with the latch free of said grooves in the clutch member, and connection means connecting said clutch member and the door for common rotation.

U.S. Pat. No. 3,789,444

Inventor: Byron McCord

Issued: Feb. 5, 1974

A boat seat holder assembly including a pair of bracket plates, and a swivel plate seat mounting assembly interconnecting the bracket plates. The bracket plates include a forward plate having a substantially monoplanar main plate portion having apertures therethrough, and having a turned over flange at the forward edge thereof defining with the main plate portion an angle of less than 60 degrees. A second or rear bracket plate has a substantially monoplanar main plate portion having apertures therethrough, and having a first flange portion bent from and extending at a right angle to, said main plate portion. The flange portion has at its free edge, a turned out, finger grip portion. The front and rear bracket plates cooperate in fitting across the permanent seat of a boat and gripping such seat. The swiveling fisherman's chair or seat for accommodating a fisherman sitting in a boat.

U.S. Pat. No. 4,936,629

Inventor: Quentin Young

Issued: Jun. 26, 1990

A swiveling infant car seat with an infant restrat device comprises a pedestal formed with a circular opening bordered by a lip to which a base is connected for distribution loads therebetween. A substantially circular base for a seat is formed with a groove around the periphery of an annulus which receives the inner periphery of the anchor plate therein to the seat to the pedestal. The base includes a pivot plate, an anchor plate, and a retainer plate for holding the pivot plate in swiveling relationship with the anchor plate. The seat is reclinably attached to the base for orientation at select inclinations, and a latch mounted on the pedestal is engageable with the base to selectively hold the seat in either a forward facing or a rearward facing orientation. A rearward member is also mounted to the rear of the pedestal and a pair of diametrically opposite, grooved receptacles are provided on the base for receiving a tongue of the rearward member to maintain the integrity of the seat in the event the automobile in which the seat is mounted is involved in a collision.

U.S. Pat. No. 5,292,179

Inventor: Dominique A. Forget

Issued: Mar. 8, 1994

A fixed plate supporting the vehicle seat is secured to longitudinal adjusting slides. The fixed plate supports a rotary intermediate plate via a first ball bearing and a cover rigidly connected to the fixed plate and supported at the rotary intermediate plate via a second ball bearing. The assembly is centered on the two ball bearings. Displacement of a central rod is controlled by a lever articulated on a pivot rigidly connected to the fixed plate. This lever is forked and cooperates with the head of the rod and a washer separated from the head by a spring mounted concentrically to the rod. The lever actuates, in one direction, two safety latches normally latching the rotary intermediate plate in order to release the seat for a 180. degree. rotation.

U.S. Pat. No. 5,318,339

Inventor: Trexie I. Cherniak

Issued: Jun. 7, 1994

A portable apparatus for expeditiously seating a handicapped or elderly person in a vehicle. The device is mounted on a car seat and includes top and bottom members which swivel relative to each other. The bottom member is removably fastened by a belt to the existing car seat.

U.S. Pat. No. 5,425,522

Inventor: Scott Retzlaff

Issued: Jun. 20, 1995

A vehicle seat adjuster includes laterally spaced track assemblies each having an upper track slidable fore-and-aft relative to a lower track and normally locked to the lower track by a latch adapted to be pivoted about an upright axis to an unlatched position. Pivoting of the latches is effected by manually turning an operating handle about a laterally extending axis, the handle being conveniently located adjacent and accessible from the outboard side of the vehicle seat.

U.S. Pat. No. 5,482,354

Inventor: Dennis J. Gryp

Issued: Jan. 9, 1996

Swivel mechanism for a vehicle seat, for example, includes a lower support-attachable element and a superimposed seat-carrying element interconnected by a turntable providing for 360 degree angular movement of the upper element about an upright axis, together with latch structure for selectively locking the upper element in plural modes in angular ranges within the 360 degree range. The turntable structure is in the form of an annulus through which securing bolts or the like pass upwardly for receipt by a retainer atop the upper element, the latter having a circular opening therein coaxial with the turntable and through which the securing bolts also pass to provide a rugged connection between the elements for resisting forces tending to separate the elements.

U.S. Pat. No. 5,651,576

Inventor: Robert James Wallace

Issued: Jul. 29, 1997

A slewing mechanism which is particularly suitable for use with a car seat for the physically disabled which permits a combined translational and rotational movement of a plate (6) or the like to which, say, a seat assembly (100) may be connected and which includes a primary arm (1) rotatable about a pivot (2) adjacent one end, a secondary arm (4) pivotally connected to the primary arm (1) by a pivot (5) adjacent the other end, the secondary arm (4) being pivotally connected to the plate (6) and a first link (8) to link the secondary arm (4) to the surface to which the primary arm (1) is pivoted and a second link (9) which connects the upper plate (6) to the primary arm (1).

U.S. Pat. No. 5,890,764

Inventor: Chang-Seog Lee

Issued: Apr. 6, 1999

A car seat, which is rotatable and linearly movable. The car seat has a lower plate having a centrally located pinion on the top surface and parallel movable rails on the bottom side. The movable rails are linearly movable on support rails fixed onto the floor of a car body. An upper plate is rotatably connected to the lower plate by a connecting shaft with a predetermined space therebetween and having a seat cushion thereon. A swivel mechanism is provided between the lower and upper plates and is used for adjusting the rotatable position of the upper plate relative to the lower plate. A plurality of locking holes are formed on each of the support rails, while a sliding lever is rotatably mounted to the movable rails and has a stopper selectively locked into or released from the locking holes.

While these car seat devices may be suitable for the purposes for which they were designed, they would not be as suitable for the purposes of the present invention, as hereinafter described.

SUMMARY OF THE PRESENT INVENTION

The present invention discloses an infant car seat mounted on a stationary platform comprising a lower horizontal plate and a vertical plate extending from one edge thereof. The stationary platform is secured by the seatbelts against the rear seat of the automobile adjacent the door. The child seat is pivotably attached to a vertical portion of the stationary platform by means of a hinge assembly that allows the user to stand outside of the vehicle and swing the seat into a position to enable them to place the child directly therein in a face-to-face manner and then swing the seat back into place and lock it into a secure position. The child seat is secured to a seat support mechanism comprising a support bar pivotably connected to a hinge assembly that slides along a track assembly so as to maintain the car seat in a protected area within the vehicle when in the pivoted position.

A primary object of the present invention is to provide a child safety seat for automobiles that pivots on a hinge to a favorable orientation for the placement and removal of an infant therein.

Another object of the present invention is to provide a child safety seat having a stationary member and a movable member.

Yet another object of the present invention is to provide a child safety seat having a stationary member that can be secured to a car seat using the existing seat belt.

Still yet another object of the present invention is to provide a child safety seat having a stationary member having fasteners forming an integral part where through the existing seat belt can be threaded through anchoring said stationary member to the car seat.

Another object of the present invention is to provide a child safety seat having a movable seat member fastened to the stationary seat member.

Yet another object of the present invention is to provide a child safety seat having a movable seat member hingedly connected to the stationary seat member.

Still yet another object of the present invention is to provide a child safety seat having a stationary seat member having tracks forming an integral part thereof.

Another object of the present invention is to provide a child safety seat having a moving seat member slidably attached to said stationary seat member.

Yet another object of the present invention is to provide a child safety seat having a bearing member positioned between the stationary seat member and the moving seat member.

A further object of the present invention is to provide a pivotable, slidable child safety seat for automobiles having a latch mechanism to lock the child seat into position once the child is secured in place.

A yet further object of the present invention is to provide a pivotable, slidable child safety seat for automobiles that increases the safety of the child and the guardian.

A still further object of the present invention is to provide a pivotable, slidable child safety seat for automobiles that is simple and easy to use.

Further objects of the present invention will appear as the description proceeds.

To the accomplishments of the above and related objects, this invention may be embodied in the form illustrated in the accompanying drawings, attention being called to the fact, however, that the drawings are illustrative only, and that changes may be made in the specific construction illustrated and described in the appended claims.

BRIEF DESCRIPTION OF THE DRAWINGS

Various other objects, features and attendant advantages of the present invention will become more fully appreciated as the same becomes better understood when considered in conjunction with the accompanying drawings, in which like reference characters designate the same or similar parts throughout the several views.

LIST OF REFERENCE NUMERALS

With regard to reference numerals used, the following numbering is used throughout the drawings.

10 present invention
12 vehicle
14 rear seat
16 baby seat
18 car door
20 guardian
22 infant
24 hinge assembly
26 vertical plate
28 stationary platform
30 track members
32 seat platform/frame
34 handle
36 safety belts
38 buckle
42 horizontal plate
43 rotating lip
44 support bar
46 lock hook
48 lock
49 lock arm
50 slot
52 outer hinge member
54 through bore
56 shaft
58 appendage
62 ball bearing
63 race
64 latch
66 spring
68 vehicle seat belt
70 shoulder harness
72 hook appendages
74 end plate
76 roller ball
78 slot
80 recess

DETAILED DESCRIPTION OF THE PREFERRED EMBODIMENTS

The following discussion describes in detail one embodiment of the invention and several variations of that embodiment. This discussion should not be construed, however, as limiting the invention to those particular embodiments, practitioners skilled in the art will recognize numerous other embodiments as well. For definition of the complete scope of the invention, the reader is directed to the appended claims.

Figure 1:
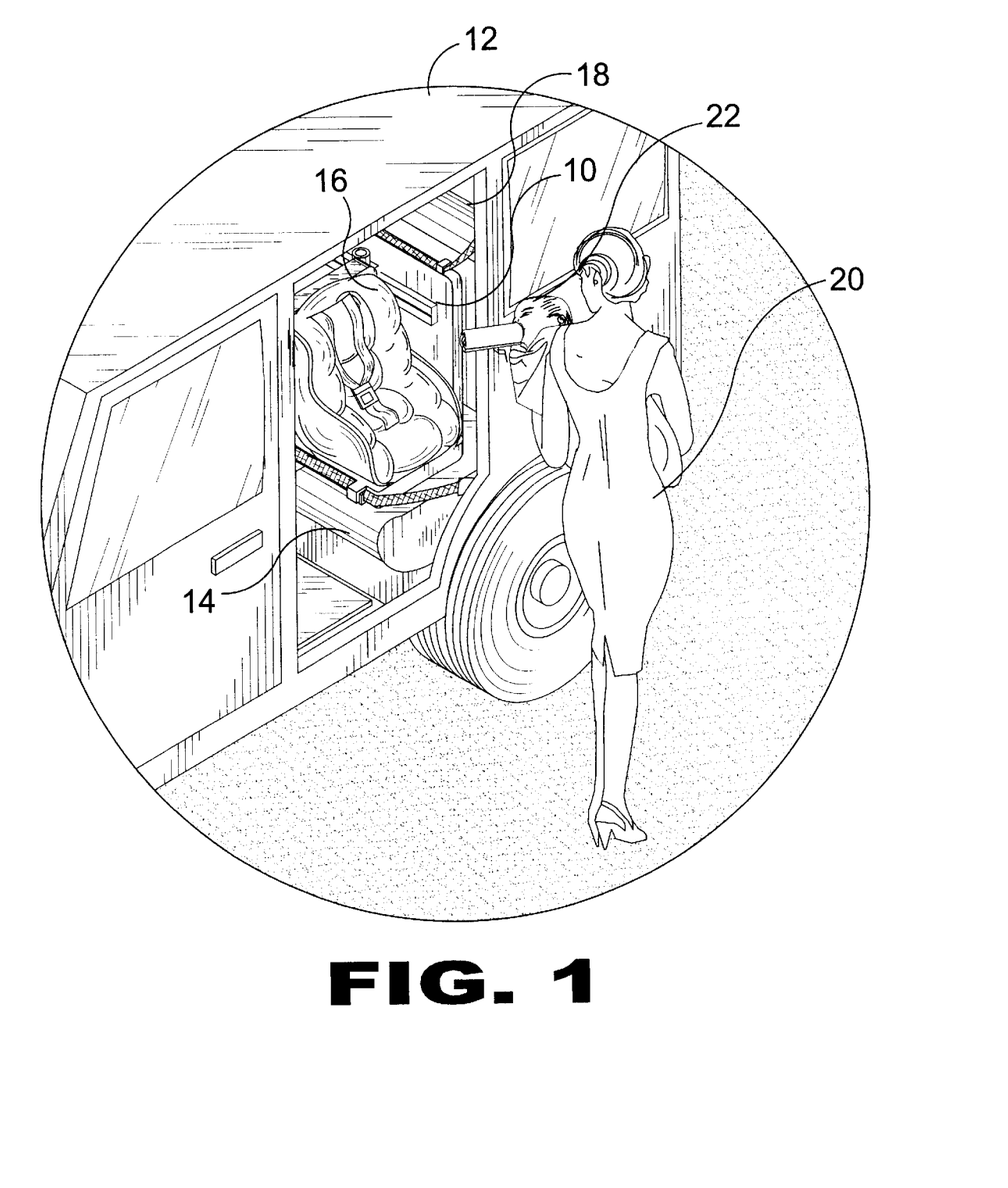
FIG. 1 is a perspective view of the present invention in use.

Turning to FIG. 1, shown therein is a perspective view of the present invention 10 in use. The present invention is installed in the vehicle's 12 rear seat 14 and the baby seat 16 has been unlocked and rotated to face the adjacent car door 18 to allow the infant's guardian 20 to insert and remove the infant 22 without having to twist and bend in awkward positions while holding the infant. A hinge assembly slides along a track to maintain the child 22 within the vehicle when the seat is rotated.

Figure 2:
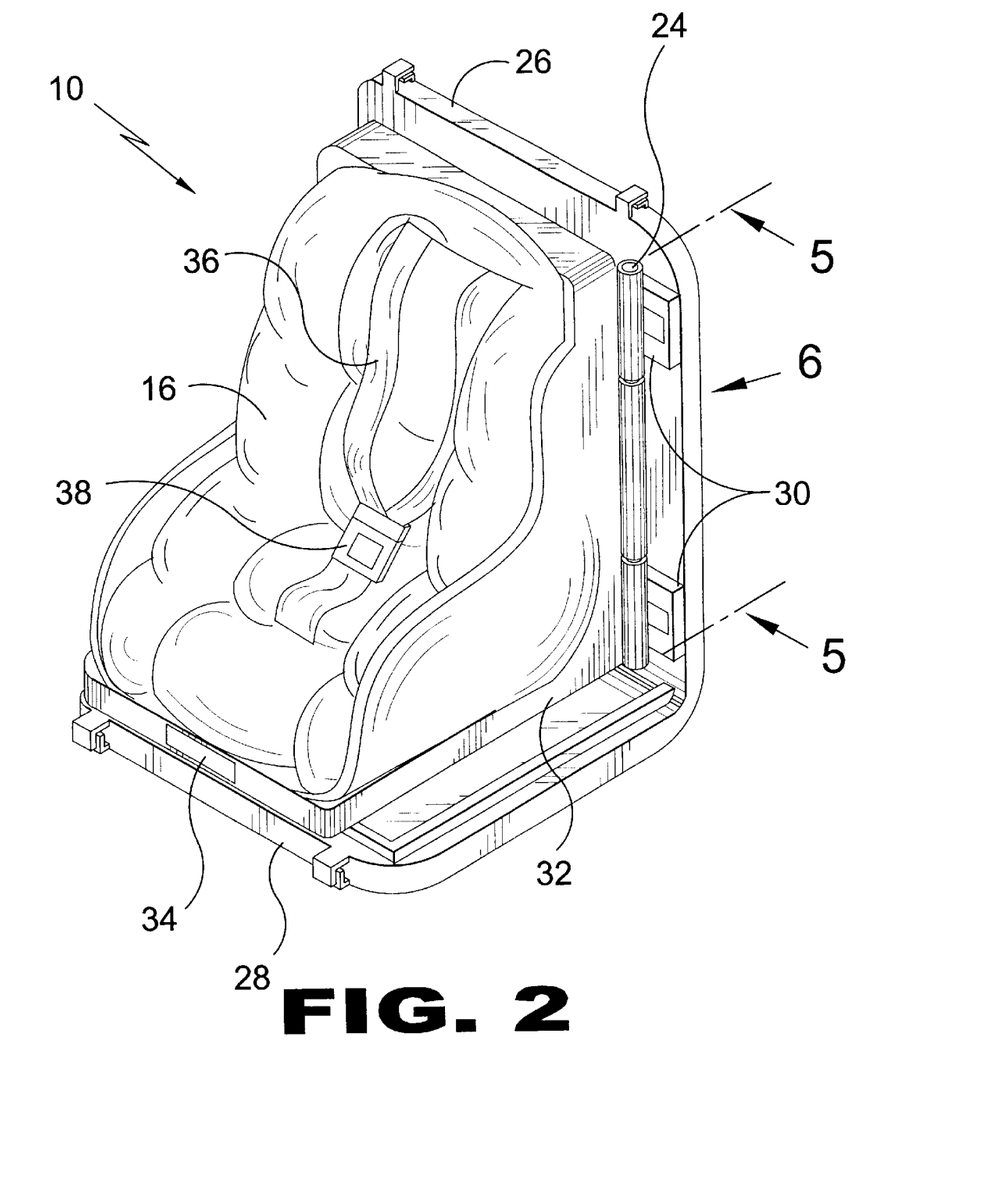
FIG. 2 pective view of the present invention.

Turning to FIG. 2, shown therein is a perspective view of the present invention 10. The child seat 16 is secured to a support bar (not shown but see FIG. 10) that has a first end integral with the hinge assembly 24 and having a second end with a lock and latch thereon for the selectively releaseable securement of the support bar to the locking mechanism on the vertical plate 26 of the stationary platform 28 wherein the vertical plate 26 is perpendicular to the stationary platform 28. The present invention is shown here in the closed locked position. Also shown are the track members 30, seat platform 32, handle 34, safety restraint belts 36 and buckle 38. Child seat 16 has a cushioned seat, back and a pair of side arms or rails thereon in which the infant sits in a conventional manner. The child seat and platform 32 are disposed between the first and second ends of the support bar.

Figure 3:
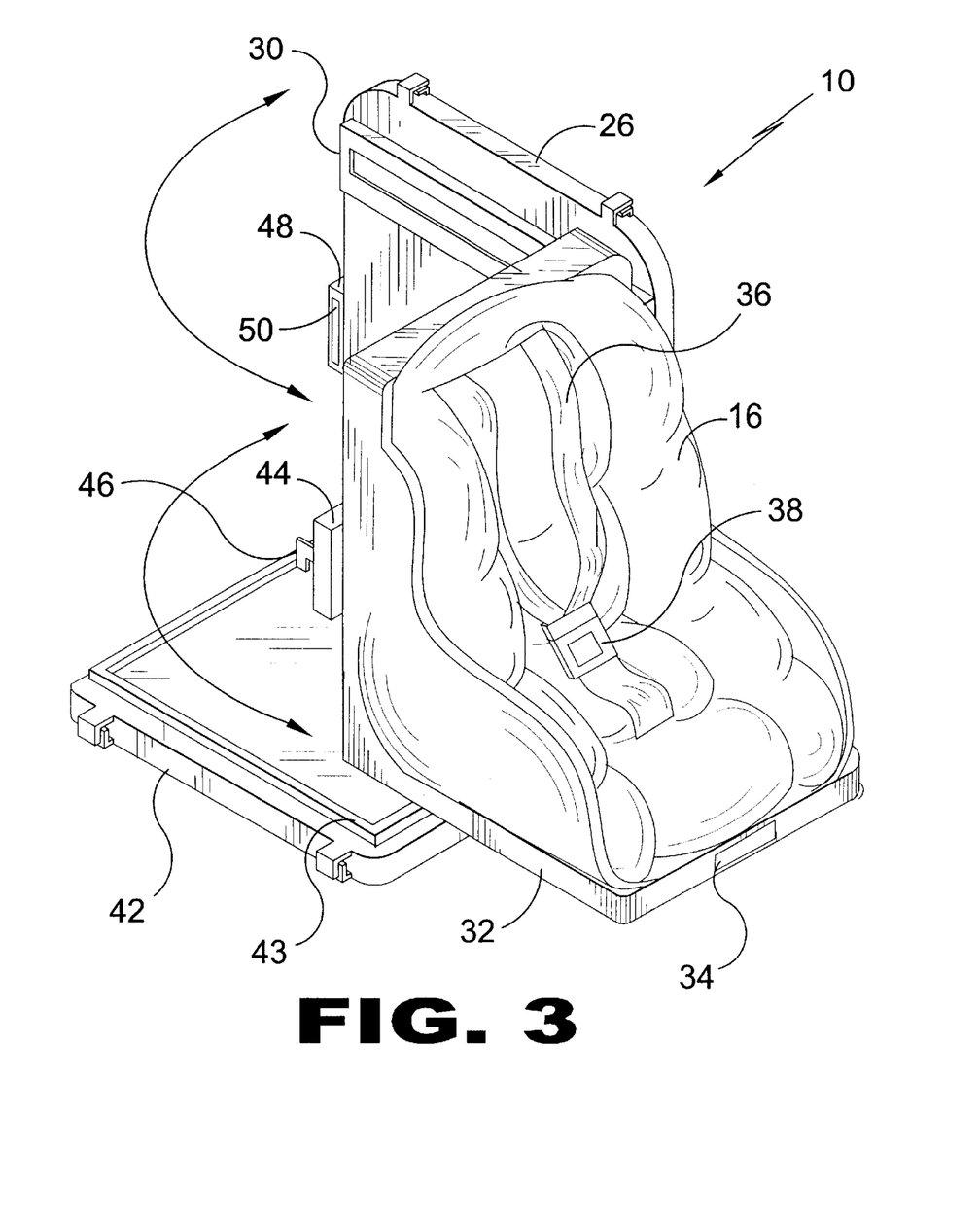
FIG. 3 is a perspective view of the present invention with the car seat pivoted open.

Turning to FIG. 3, shown therein is a perspective view of the present invention 10 with the car seat 16 in the open position. The child seat 16 has been unlocked and rotated in the horizontal plane to face the door opening. A forwardly positioned handle 34 provides for easy manipulation of the seat frame 32 using the swivel hinge and double slide track 30. Also shown are the horizontal plate 42 with retaining lip 43 of the stationary platform, the support bar 44, the lock hook 46, and the lock 48 with slot 50. Other elements previously disclosed are also shown.

Figure 4:
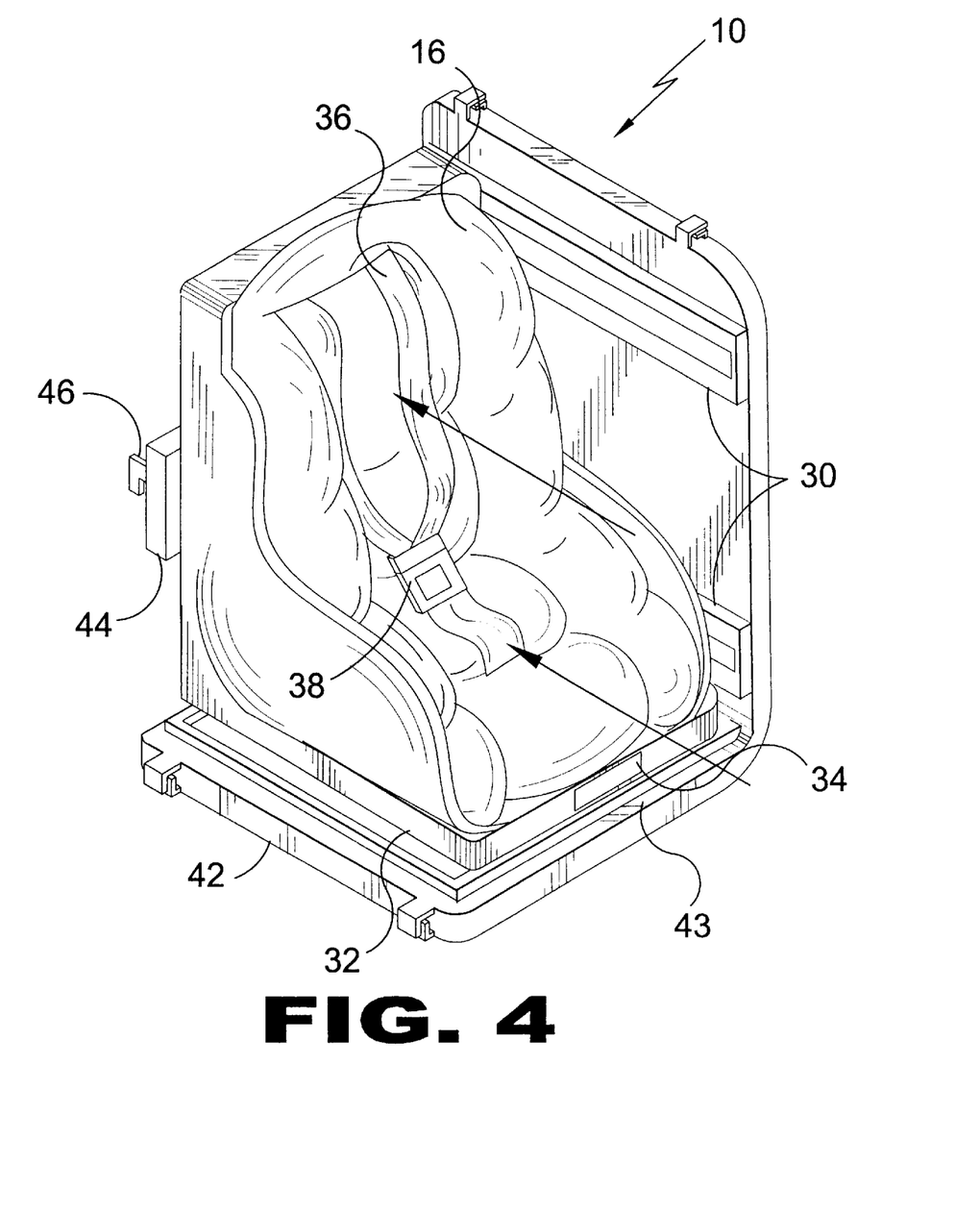
FIG. 4 is a perspective view of the present invention with the car seat pivoted open and slid along the track.

Turning to FIG. 4, shown therein is a perspective view of the present invention 10 with the car seat 16 pivoted open and slid horizontally along the track members 30 in a position ready to accept the child. Other elements previously disclosed are also shown.

Figure 5:
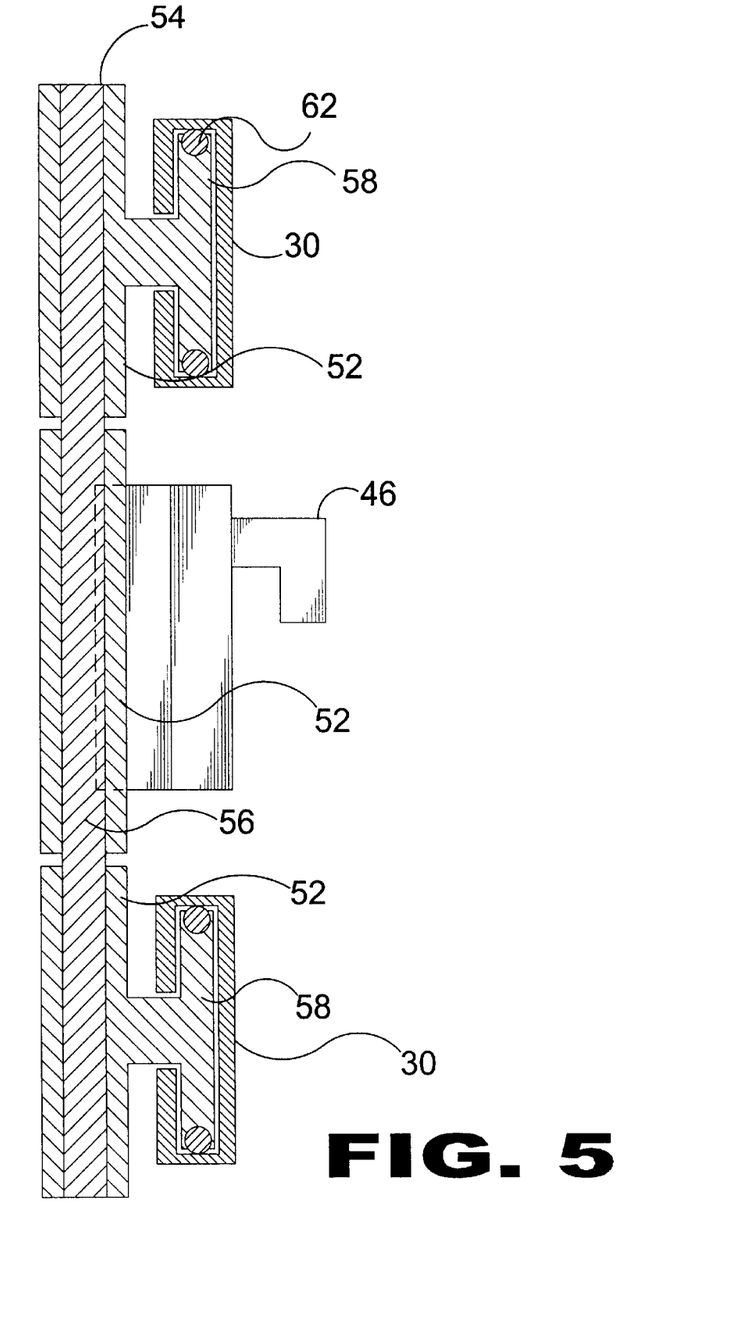
FIG. 5 is a cross-sectional side view of the child seat support mechanism.

Turning to FIG. 5, shown therein is a cross sectional side view of the seat support mechanism. A plurality of outer hinge members 52 with through bores 54 have a central shaft 56 running through them to form a hinge system. The hinge members 52 have an appendage 58 thereon with ball bearings 62 thereon that fits into the interior of the seat back track 30 for cooperation therewith and connection thereto. The lock hook 46 is also shown.

Figure 6:
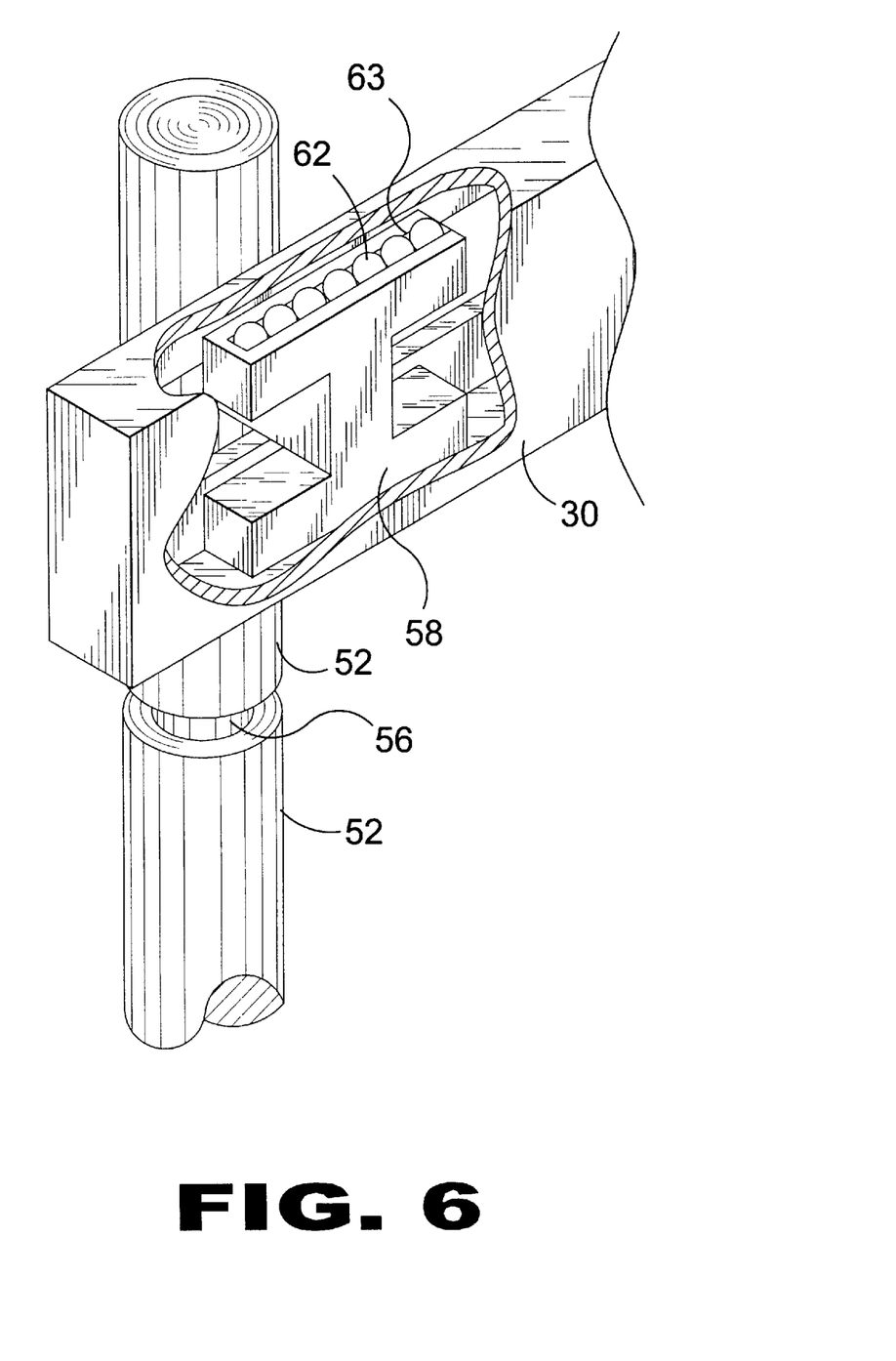
FIG. 6 is a partial sectional view of the track assembly.

Turning to FIG. 6, shown therein is a partial sectional view of the track assembly. I-shaped appendages 58 with an upper and lower portion emanate from the hinge members 52 utilizing bearings 62 in race 63 to smoothly slide within their respective track members 30. The track members 30 are a rectangular elongated housing having a cavity therein Shaft 56 is also shown.

Figure 7:
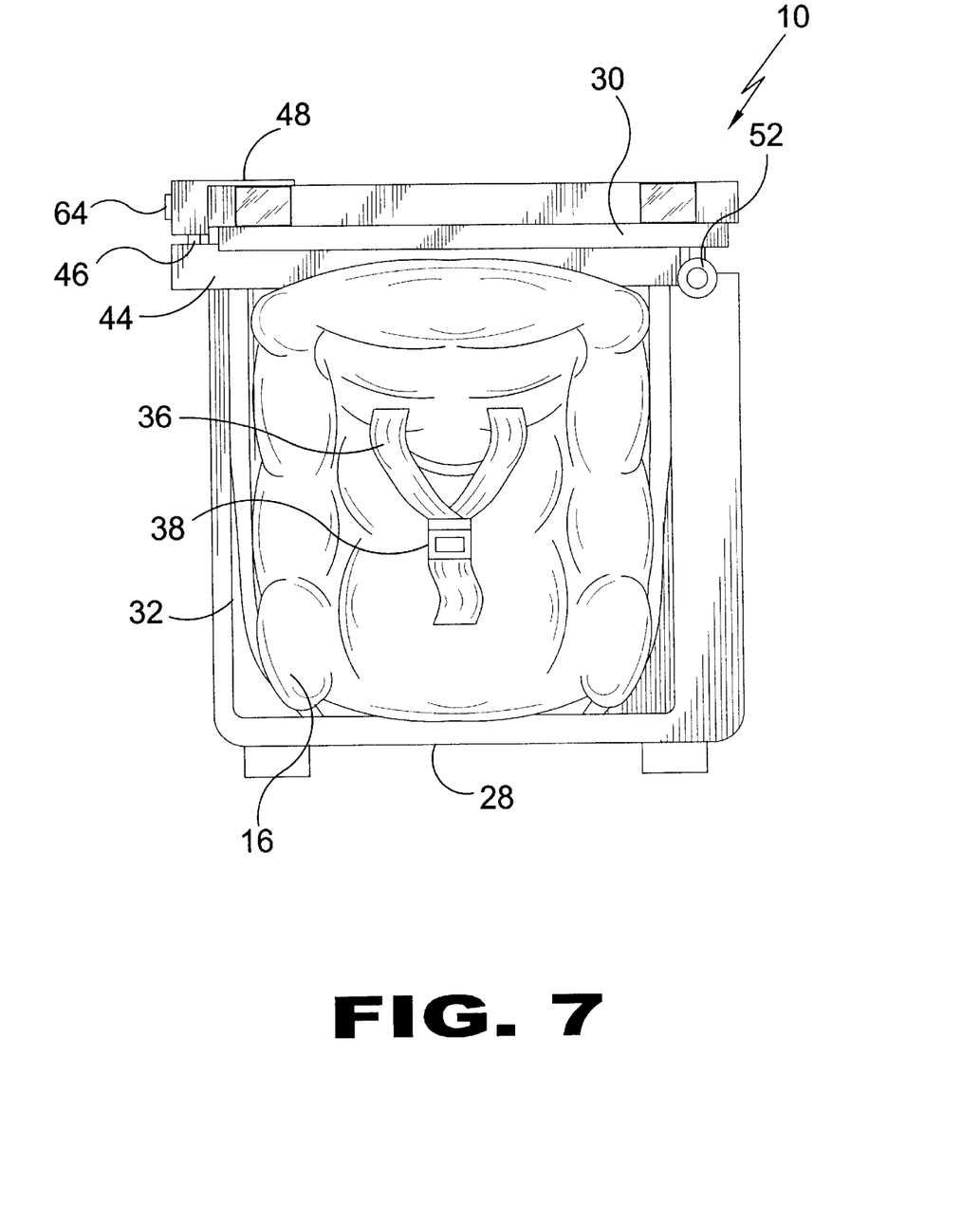
FIG. 7 is a top view of the present invention.

Turning to FIG. 7, shown therein is a top view of the present invention 10 depicting the relationships between the various assemblies of the present invention. Latch 64 is shown along with elements previously disclosed.

Figure 8:
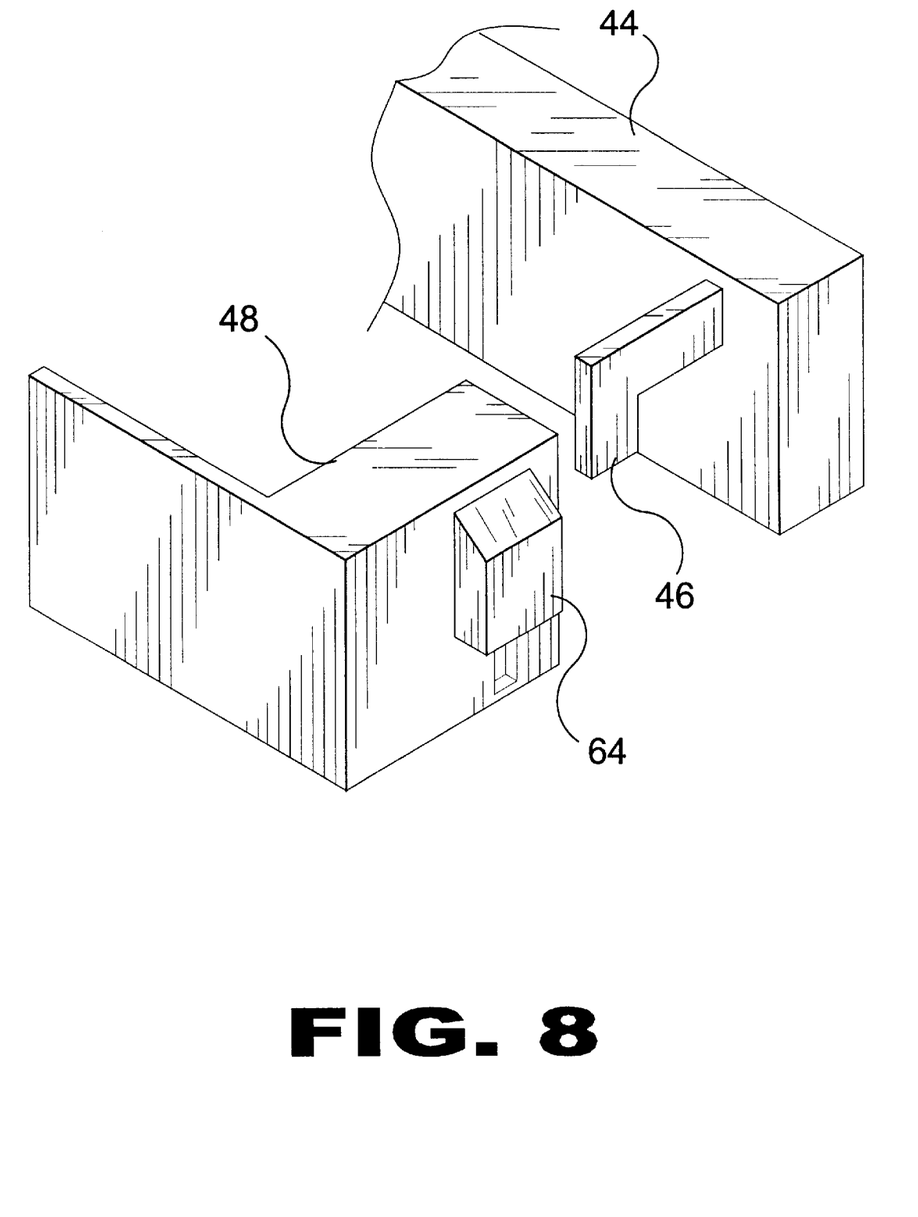
FIG. 8 is a perspective view of the lock mechanism.

Turning to FIG. 8, shown therein is a perspective view of the locking latch 64 mechanism of the present invention showing a lock 48 with a lock hook 46 on a support bar 44 that slides into the lock 48 for securement and a latch to release the lock hook.

Figure 9:
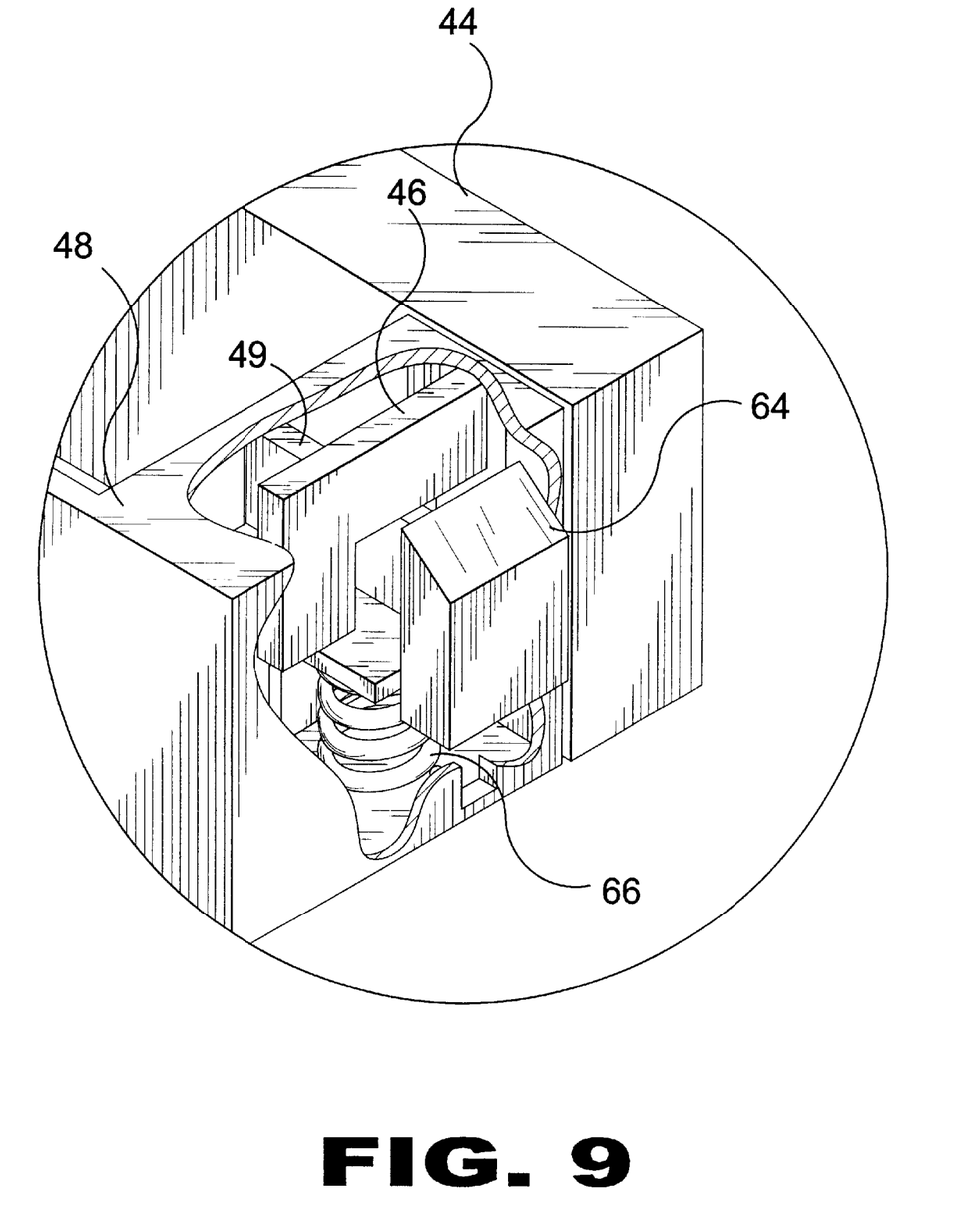
FIG. 9 is a partial sectional view of the lock mechanism.

Turning to FIG. 9, shown therein is a partial sectional view of the locking mechanism with the downwardly extending hook 46 of the support bar 44 inserted and locked into the lock 48 by hooking over the generally horizontally disposed arm 49 of the lock. The latch 64 is pushed upwardly by a spring 66 so that it becomes an obstruction to the lock hook 46 thereby preventing it from disengaging from the lock arm 49.

Figure 10:
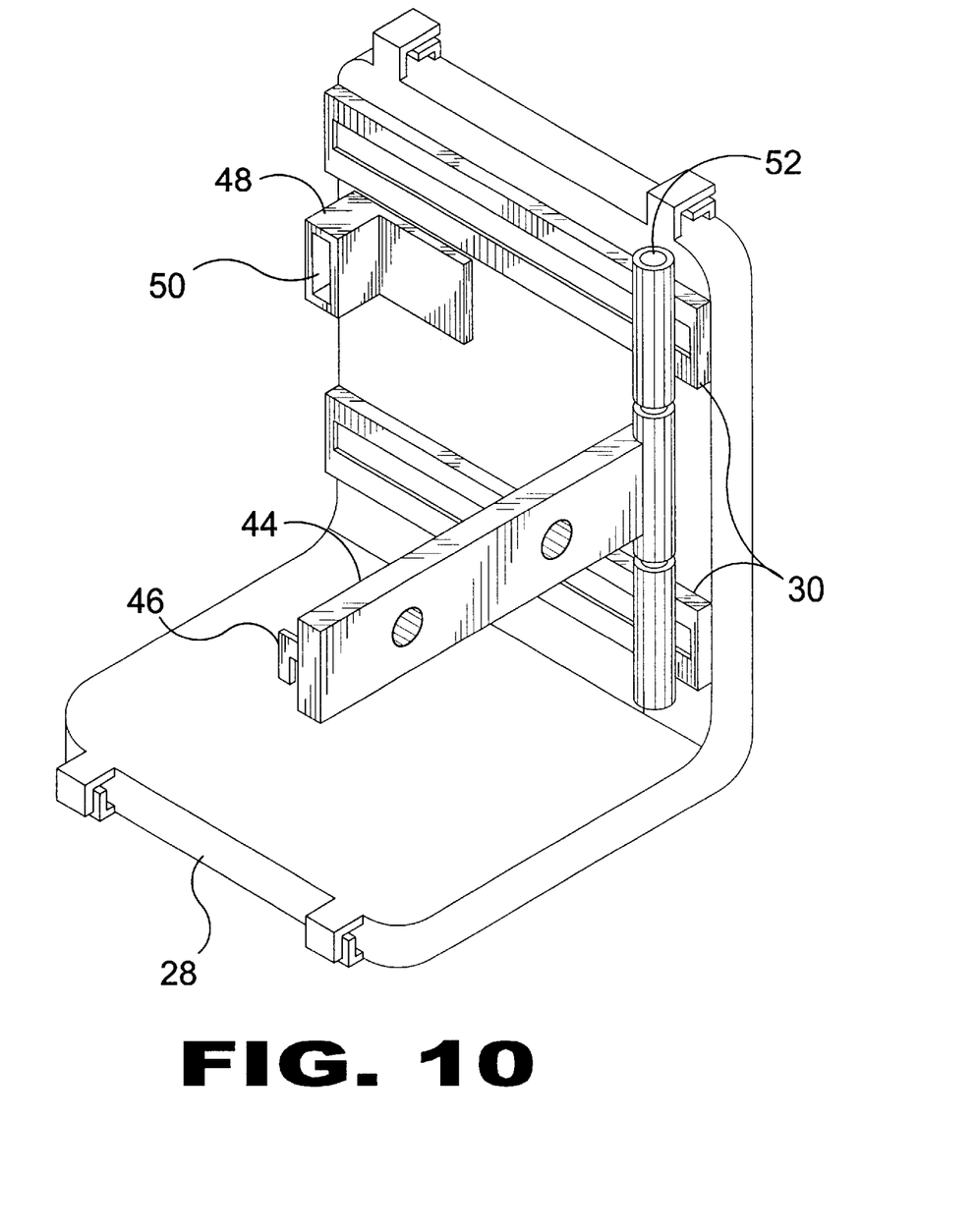
FIG. 10 is a perspective view of the stationary platform and the seat support mechanism.

Turning to FIG. 10, shown therein is a perspective view of the stationary platform 28 and the seat support mechanism wherein the support bar 44 is an integral part of the hinge 52 and is shown in the unlocked, pivoted position. Other elements previously disclosed are also shown.

Figure 11:
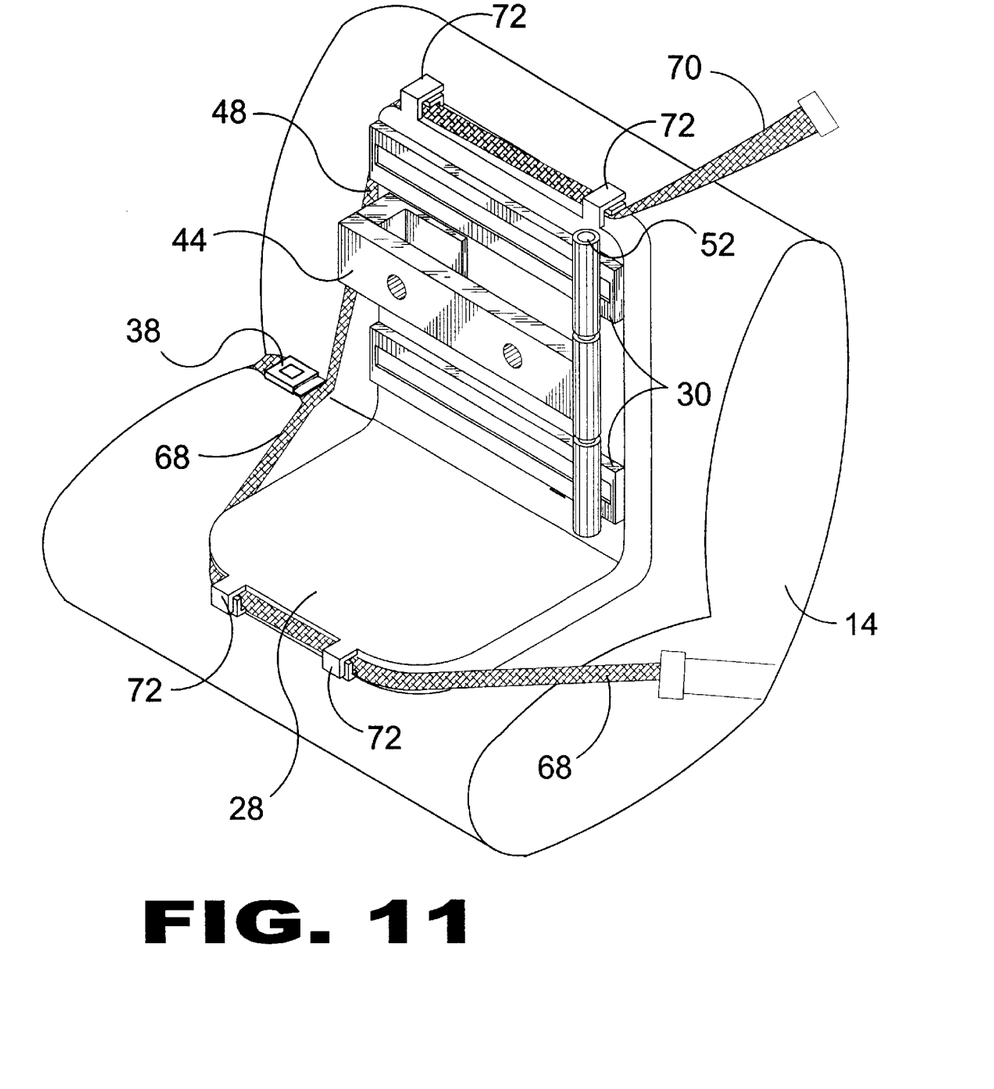
FIG. 11 is a perspective view of the stationary platform and the seat support mechanism.

Turning to FIG. 11, shown therein is a perspective view of the stationary platform 28 and the seat support mechanism wherein the support bar 44 is in the closed locked position and the stationary platform 28 is secured against the automobile seat 14 by the vehicle seat belts 68. One possible fastening configuration is shown in these drawings wherein the flexible straps 68 of the safety belt 68 and shoulder harness 70 are threaded through hook-like appendages 72 to prevent movement of the stationary platform 28. The waist strap is threaded through the hook-like appendages 72 on the front edge of the horizontal plate and the shoulder strap is threaded through appendages 72 on the top edge of the vertical plate. Other configurations and methods of using the safety belts of the automobile to secure the baby seat may be adapted without altering the essence of the present invention. Other elements previously disclosed are also shown.

Figure 12:
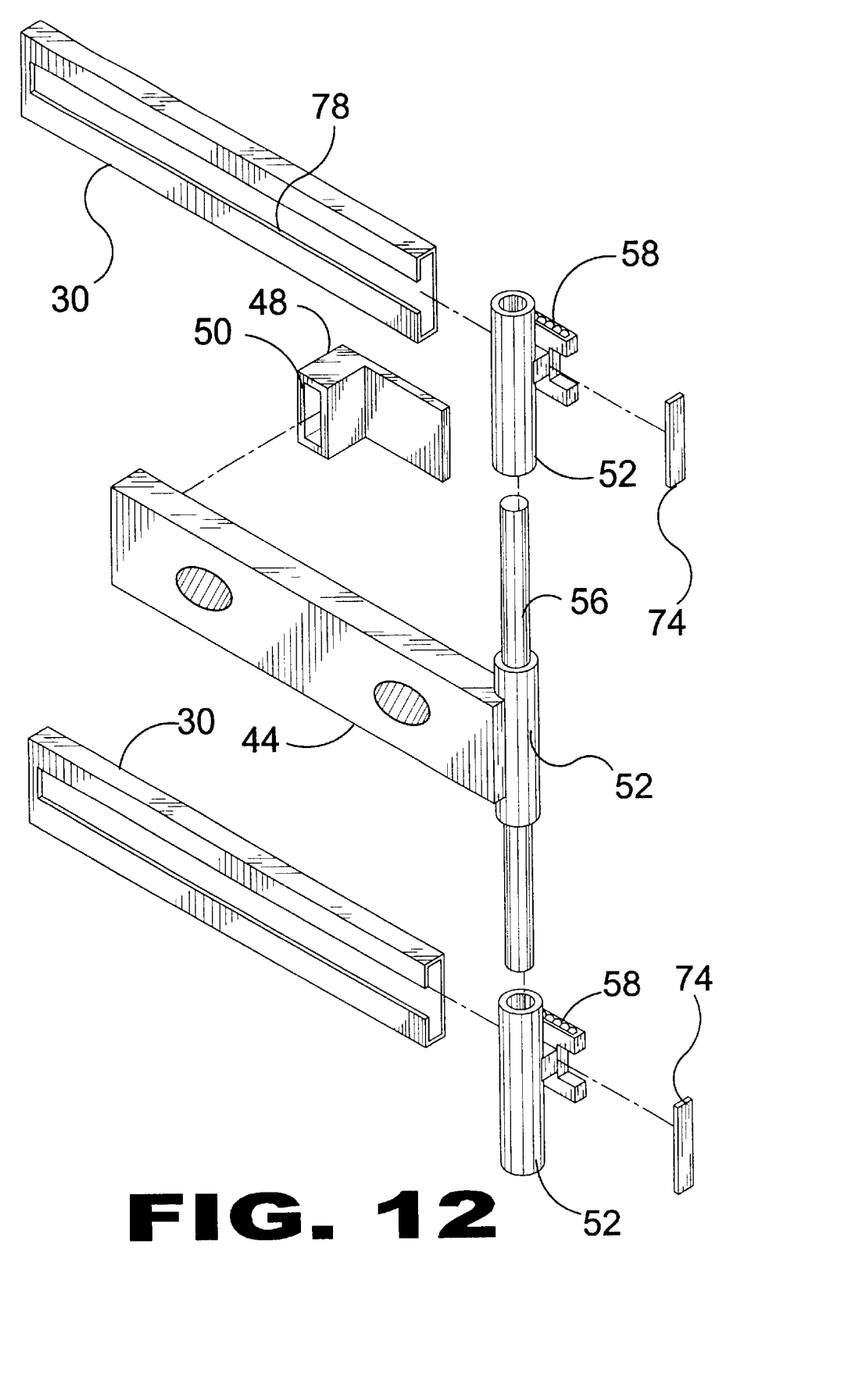
FIG. 12 is an exploded view of the support mechanism.

Turning to FIG. 12, shown therein is an exploded view of the support assembly showing the various components that provide for the pivoting and linear movement of the child seat relative to the stationary platform. Shown are the front face of the track members 30 having a slot 78 therein for receiving the I-shaped appendage 58 and an end plate 74 along with other elements previously disclosed.

Figure 13:
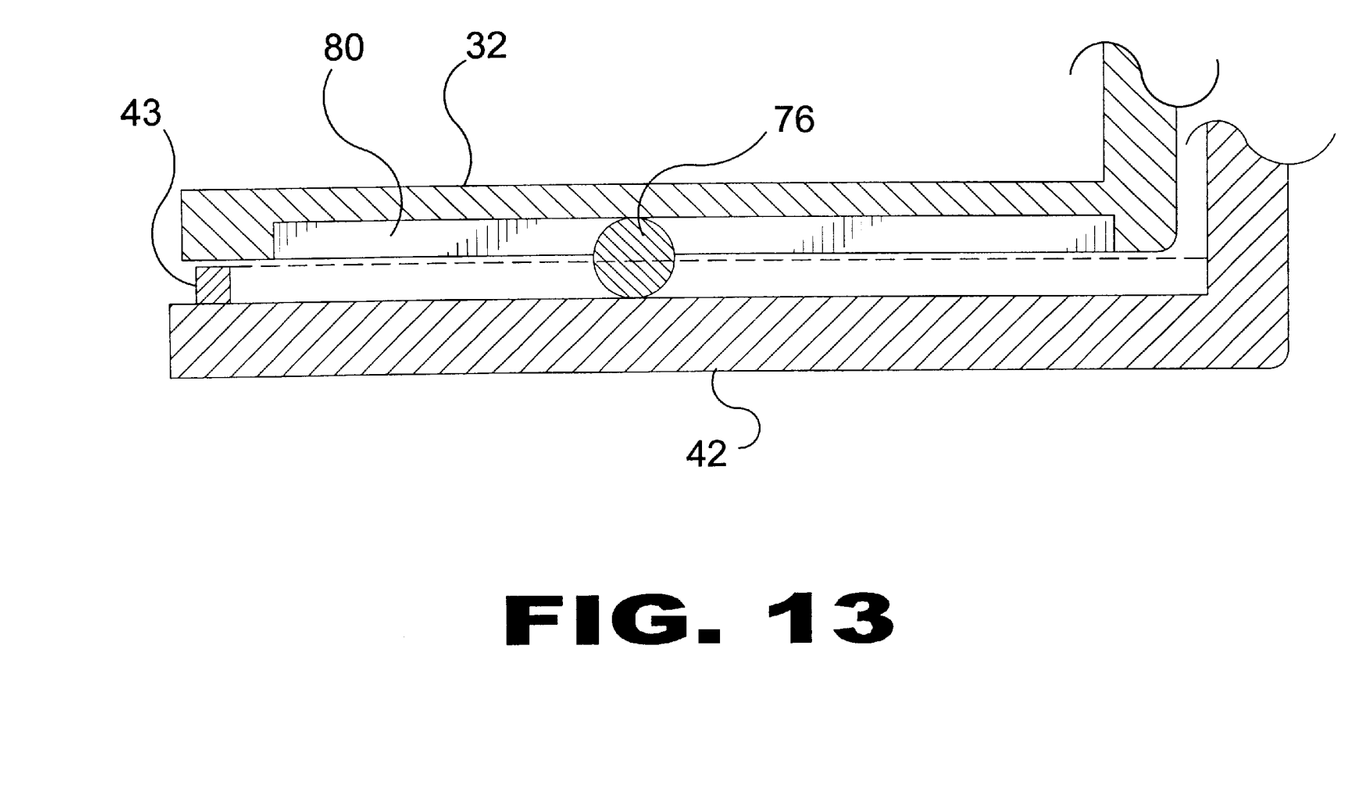
FIG. 13 is a cross-sectional side view of the seat frame and the stationary platform of the present invention.

Turning to FIG. 13, shown therein is a cross-sectional side view of the seat frame 32 and the horizontal plate of the stationary platform 42 having a roller ball 76 centrally located between the bottom portion of the seat frame 32 and the top of the horizontal plate of the stationary platform 42 to aid in the smooth movement of the child seat while reducing stress applied to the support arm and attached hinge assembly. Retaining lip 43 and recess 80 are also shown for retaining the ball 76 thereinbetween.

I claim:

1. An apparatus for an infant car seat for placement in a seat of a vehicle, the vehicle being equipped with safety belts, comprising:

a) a child seat, said seat having a cushioned seat, a cushioned seat back, a pair of side arms and a child safety restraint thereon;

b) a seat platform for receiving said child seat, said platform having a bottom portion and a back portion;

c) a stationary platform for receiving said seat platform, said stationary platform having a horizontal plate and a vertical plate thereon;

d) means for rotatably connecting said seat platform onto said stationary platform whereby said seat platform partially rotates in the horizontal plane;

e) means for slidably connecting said seat platform onto said stationary platform, whereby said seat platform slides in the horizontal plane; and, f) means for attaching said stationary platform to the seat in a vehicle whereby said stationary platform is removably secured to the seat back of the vehicle.

2. The apparatus of claim 1, wherein said means for rotatably connecting said seat platform onto said stationary platform further comprises a hinge assembly disposed onto said vertical plate of said stationary platform, a support bar having a first end disposed onto said hinge assembly and a second end having a means for a lock disposed thereon whereby said support bar is locked to said vertical plate of said stationary platform, wherein said support bar has said back portion of said seat platform disposed thereon between said first and second ends thereof.

3. The apparatus of claim 2, said hinge assembly further comprising a plurality of outer hinge members having a central bore therein, and a central shaft for insertion through said central bore for rotation of said outer hinge members thereon said central shaft.

4. The apparatus of claim 3, said outer hinge members further comprising a plurality of appendages disposed thereon, said appendages for cooperation with and connection to said means for slidably connecting said seat platform onto said stationary platform.

5. The apparatus of claim 4, wherein said means for a lock further comprises a lock having a slot therein, said lock disposed on said vertical plate of said stationary platform, further a generally horizontally disposed lock arm and a downwardly extending hook for insertion into said slot and for hooking to said lock arm, and a latch for controlling the position of said hook in relation to said lock arm.

6. The apparatus of claim 5, wherein said means for slidably connecting said seat platform onto said stationary platform further comprises at least two elongated track members horizontally disposed on said vertical plate of said stationary platform, said track members having a track therein for slidably receiving said appendages of said outer hinge members.

7. The apparatus of claim 6, said track member further comprising an elongated rectangular housing having an inner cavity therein, said track members having a front face, said front face having a slot therein for receiving said appendages of said outer hinge member.

8. The apparatus of claim 7, said appendages of said outer hinge member further comprising an I-shaped member for slidable insertion into said track of said track member, said I-shaped member having a top portion and a bottom portion.

9. The apparatus of claim 8, said top and bottom portion of said I-shaped member each having a race therein, said race for receiving a plurality of ball bearings.

10. The apparatus of claim 9, wherein said ball bearings are placed contiguous to said interior of said track member for smooth movement of said I-shaped members therein.

11. The apparatus of claim 10, wherein said means for attaching said stationary platform to the seat in the vehicle further comprises a plurality of hook appendages disposed on the top edge of said vertical plate of said stationary platform and on the front edge of said horizontal plate of said stationary platform, said hook appendages for receiving the safety belts of the vehicle therein for attaching said stationary platform to the seat of the vehicle.

12. The apparatus of claim 11, wherein said hook appendage on said vertical plate receives the shoulder strap of the vehicle therein.

13. The apparatus of claim 12, wherein said hook appendage on said horizontal plate receives the waist strap of the vehicle therein.

14. The apparatus of claim 13, further comprising a roller ball disposed between said bottom portion of said seat platform and said horizontal plate of said stationary platform.

15. The apparatus of claim 14, further comprising a recess on said bottom portion of said seat platform and a retaining lip on said horizontal plate of said stationary platform for retaining said roller ball thereinbetween.

* * * * *